Jan. 6, 1948.          H. C. MAY ET AL          2,433,916
CONTROL MECHANISM FOR PROPULSION SYSTEMS
Original Filed Feb. 10, 1944        3 Sheets-Sheet 3
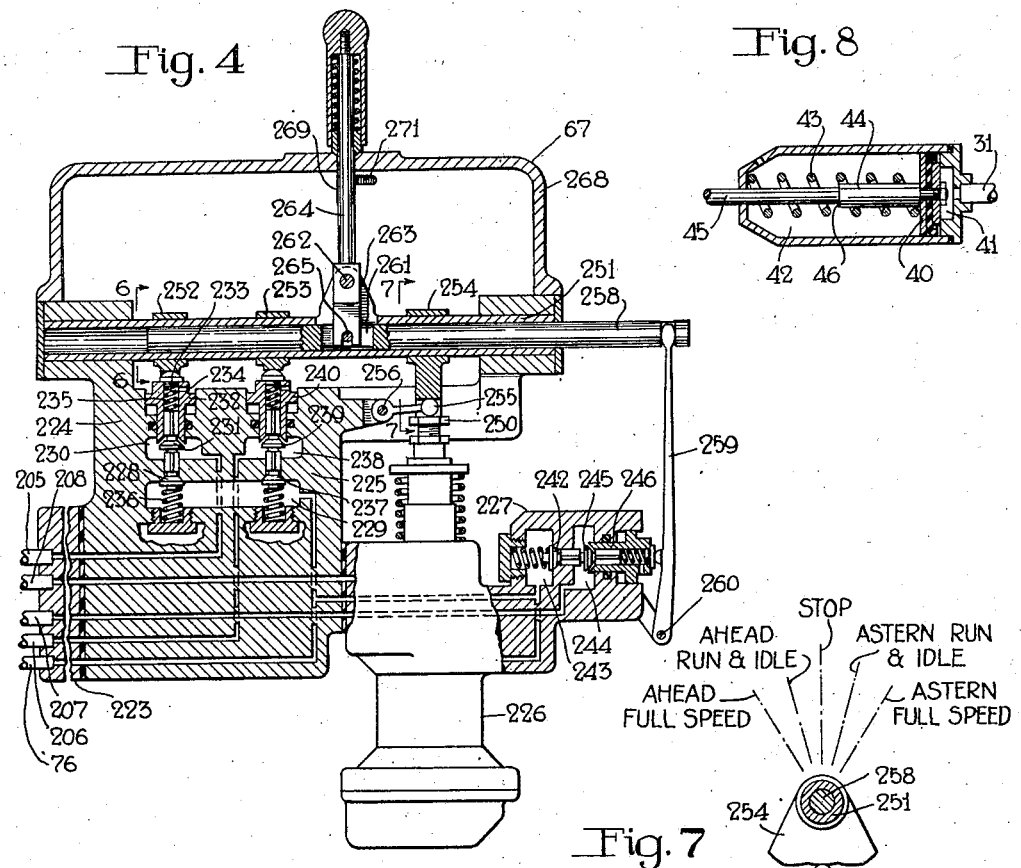
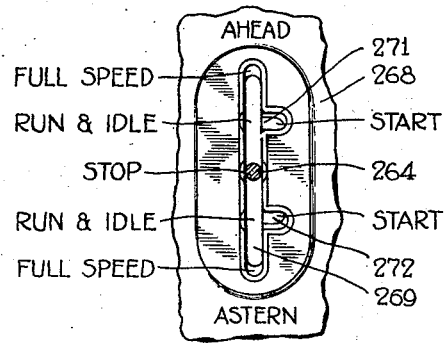
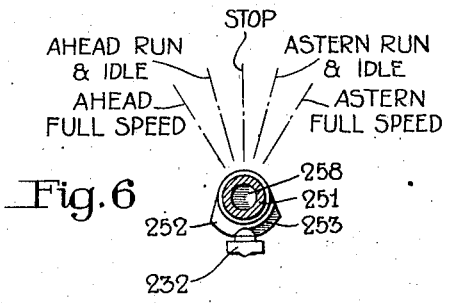
INVENTORS
Harry C. May
Roy R. Stevens
BY
ATTORNEY Patented Jan. 6, 1948

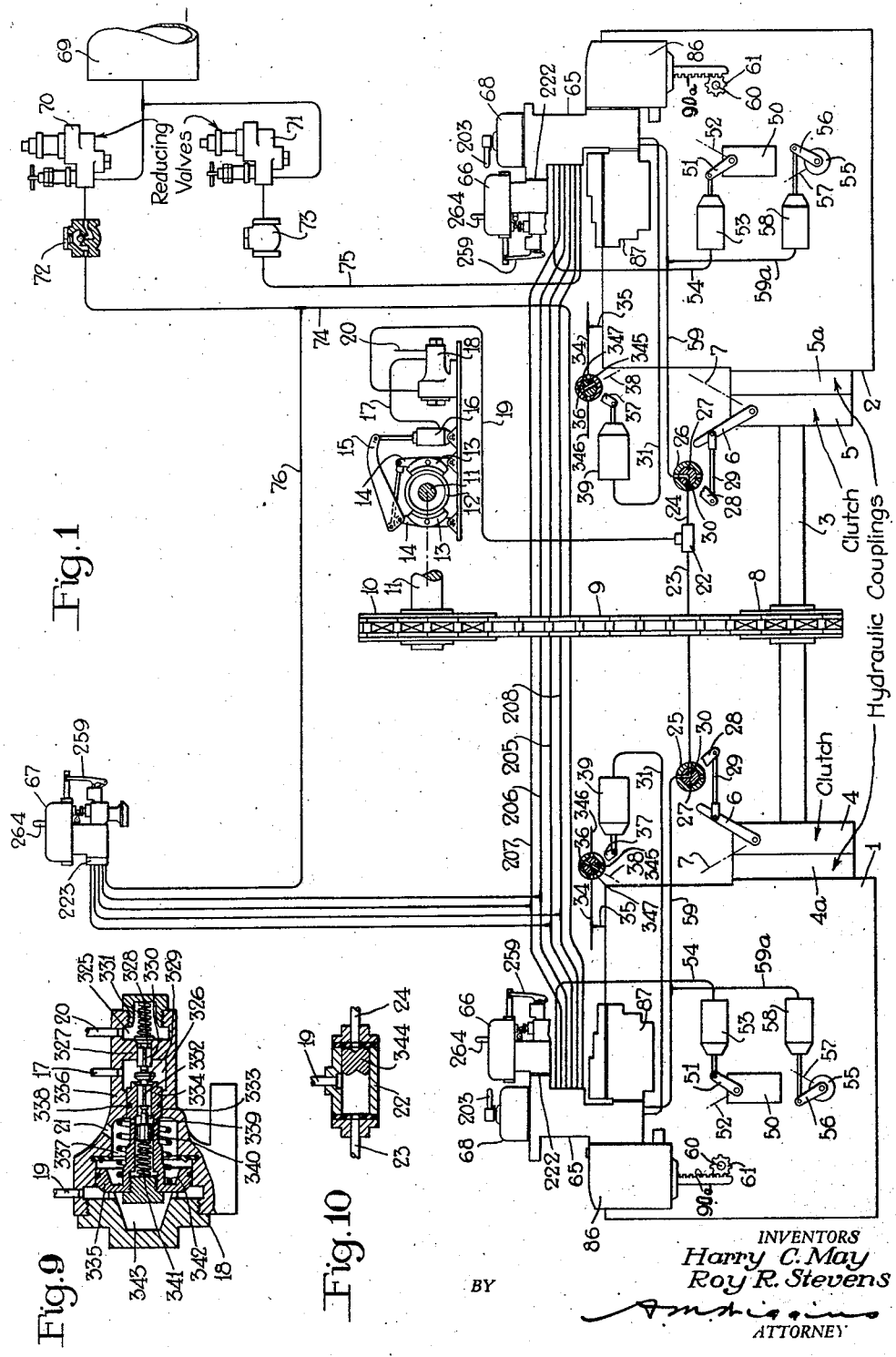

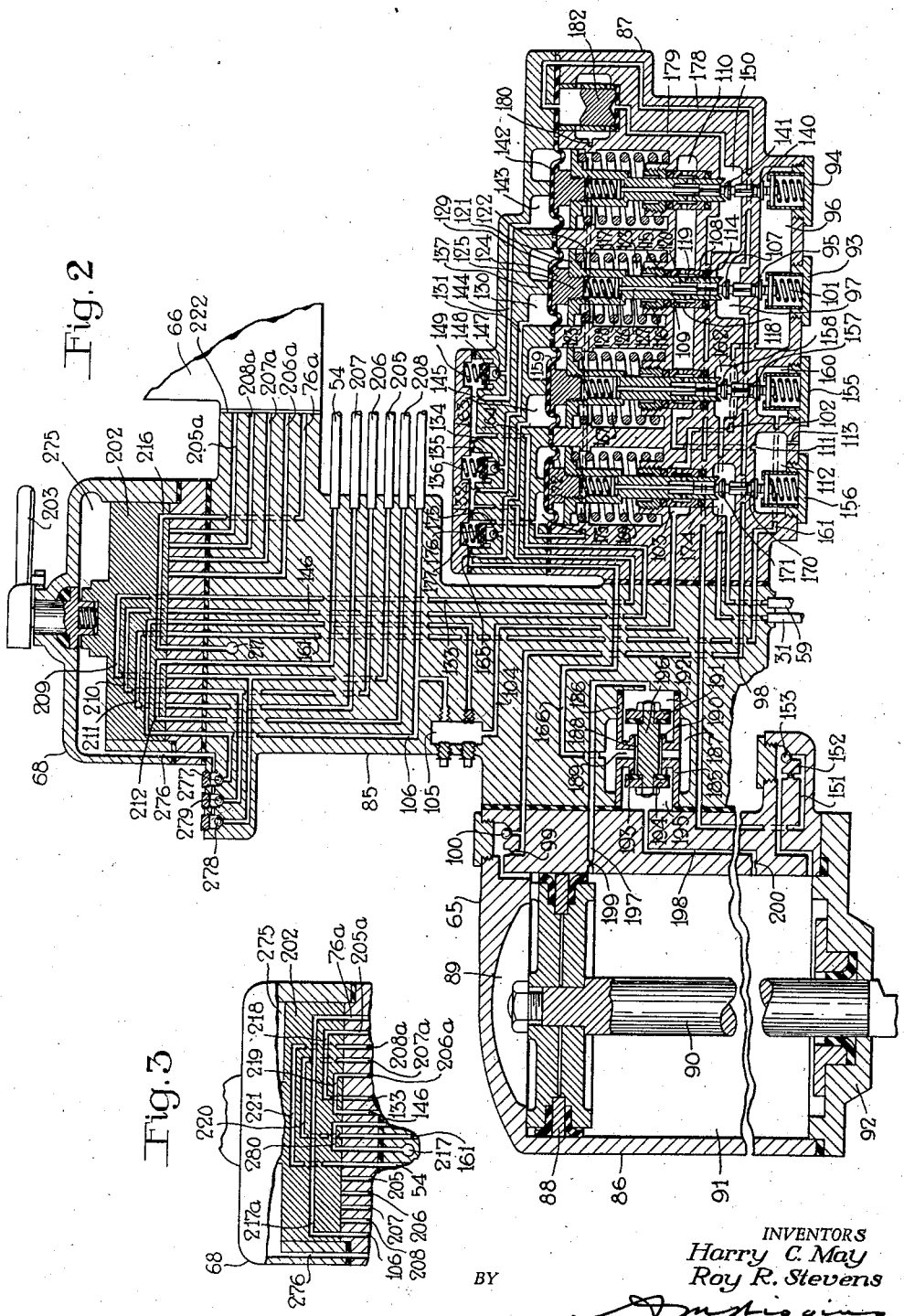

2,433,916

UNITED STATES PATENT OFFICE 2,433,916

CONTROL MECHANISM FOR PROPULSION SYSTEMS

Harry C. May, East McKeesport, and Roy R. Stevens, Forest Hills, Pa., assignors to The Westinghouse Air Brake Company, Wilmerding, Pa., a corporation of Pennsylvania Original application February 10, 1944, Serial No. 521,798. Divided and this application December 28, 1944, Serial No. 570,103

3 Claims. (Cl. 60—97)

This invention relates to control mechanism and more particularly to means for controlling a propulsion system, such as for a ship; the present application being a division of our copending application Serial No. 521,798 filed February 10, 1944.

The propulsion system on certain ships embodies reversible internal combustion engines, such as of the Diesel type, for driving the ship's propeller, and means are provided for stopping, reversing, starting and for controlling the speed of the engines either individually or in multiple, and for also connecting and disconnecting the engines to and from the propeller.

One object of the invention is the provision of such a system embodying braking means for braking the propeller and any engine or engines connected to said propeller by individual clutches, and further embodying means operable upon operation of a clutch to disconnect an engine from the propeller in order to provide for control of the disconnected engine by individual control means, to maintain said braking means effective, as required, to control the propeller and the engine still connected to said propeller, but non-controllable by said individual control means and ineffective upon the disconnected engine.

According to this object, when any one or more engines are connected to drive the propeller, the braking means is effective to stop the propeller and the connected engine or engines upon operation of an operator's control device to stop or to reverse the engine or engines. The operation of a clutch to disconnect an engine from the propeller to provide for individual operation and control of the disconnected engine does not change, however, the cooperation and action of the braking means with respect to the engine still connected to the propeller, but does render the braking means ineffective with respect to the disconnected engine. Thus, if one engine is disconnected from the propeller for operating other apparatus such as a fire pump, or possibly for repair, it will have no effect upon the operation of the braking means for stopping the other engine still connected to and employed for operating the propeller.

Other objects and advantages will be apparent from the following more detailed description of the invention.

In the accompanying drawings; Fig. 1 is a diagrammatic view, mainly in elevation, of a pneumatic control system for a plurality of engines embodying the invention; Fig. 2 is a vertical, sectional view of a pneumatic control device associated with each of the engines shown in Fig. 1 for controlling the individual starting, stopping, reversing, etc., of the respective engine; Fig. 3 is a diagrammatic sectional view of a portion of a selector valve device shown in Fig. 1 in elevation and in Fig. 2 in section, but with the selector or rotary valve in a different position than shown in Fig. 2; Fig. 4 is a diagrammatic sectional view of an operator's control device several of which are employed and distributed at different control stations as shown in elevation in Fig. 1; Fig. 5 is a partial plan view of the operator's control device shown in Fig. 4; Figs. 6 and 7 are sectional views taken on the lines 6—6 and 7—7, respectively, in Fig. 4; Fig. 8 is a sectional view of a pneumatic cylinder several of which are shown in elevation in Fig. 1; and Figs. 9 and 10 are horizontal sectional views of two different elements shown in outline in Fig. 1.

Description

In Fig. 1 of the drawings, the reference numerals 1 and 2 indicate two like internal combustion engines of the reversible Diesel type which are arranged to be connected through hydraulic couplings 4a and 5a and clutches 4 and 5 respectively, to a common drive shaft 3. The hydraulic couplings 4a and 5a are constantly effective, while each of the clutches 4 and 5 may be provided with a manually operable lever 6 having what may be called an engaged position, in which it is shown in the drawing, for effecting operation of the clutch to connect the respective engine to the drive shaft 3, and being movable to what may be called a disengaged position, indicated by a dot and dash line 7, for actuating the clutch to disconnect the respective engine from said drive shaft.

A sprocket wheel 8 secured to turn with the drive shaft 3 is connected by a chain 9 to a sprocket wheel 10 which is arranged to turn a shaft 11 which may be a ship's propeller shaft.

A brake is associated with propeller shaft 11 for braking same to stop either or both of the engines 1 and 2. This brake may comprise a brake drum 12 arranged to turn with the propeller shaft 11, and brake shoes 13 arranged at opposite sides of the brake drum for frictionally engaging same. The brake shoes 13 are carried by levers 14 which are operably connected to a controlling lever 15. One end of lever 15 is operatively connected to a brake cylinder device 16 arranged to be operated by fluid under pressure supplied through a pipe 17 for actuating said lever to move the brake shoes 13 into frictional engagement with drum 12. Upon release of fluid under pressure from said brake cylinder device by way of pipe 17, lever 15 will operate to allow release movement of the brake shoes 13 away from the brake drum.

The supply and release of fluid under pressure to and from the brake cylinder device 16 by way of pipe 17 is arranged to be controlled by a relay valve device 18. The relay valve device 18 comprises, as shown in Fig. 9 of the drawing, a casing having chambers 325 and 326 separated by a wall 327 and containing, respectively, two coaxially aligned poppet valves 328 and 329 arranged to seat in the same direction. The valve 328 has a fluted stem 330 extending through a bore in wall 327 into chamber 326 wherein it engages the valve 329. A spring 331 in chamber 325 acts on valve 328 urging it toward a seat provided on wall 327.

The valve 329 has a fluted stem 332 arranged to slide in a portion of a bore 333 provided in a plunger 334 which projects from one side of a piston 335 and which is slidably mounted in a bore provided through a wall 336 separating chamber 326 from a chamber 337 at said one side of said piston. A sealing ring 338 carried by plunger 334 has sliding and sealing contact with the surface of the bore through wall 336 to prevent leakage of fluid under pressure from chamber 326 past said plunger to chamber 337. A seat is provided on the end of plunger 334 for engagement by valve 329.

The bore 333 in plunger 334 is open through one or more ports 339 to chamber 337 and slidably mounted in said bore is a follower 340 one end of which engages the valve stem 332. A precompressed spring 341 contained in bore 333 is interposed between the opposite end of plunger 340 and the piston 335 for unseating valve 329 from the end of plunger 334. A coil spring 342 encircling plunger 334 in chamber 337 has one end supported on the casing wall 336 while the opposite end bears against piston 335. Spring 342 is also under pressure and is constantly effective to urge the piston 335 to the position shown in the drawing for pulling plunger 334 out of seating engagement with valve 329.

The valve chamber 325 is open to a fluid pressure supply pipe 20 adapted to be supplied with fluid under pressure from any suitable source. Valve chamber 326 is connected to pipe 17 leading to the brake cylinder device 16. Chamber 337 is open to atmosphere through a port 21, while at the opposite side of piston 335 is a control chamber 343 which is connected to a control pipe 19.

The operation of the relay valve device 18 is as follows:

When fluid under pressure is supplied to chamber 343, in a manner which will be later described, the piston 335 will move against spring 342 and shift the plunger 334 first into seating engagement with valve 329 and then act through said valve to open valve 328. When valve 328 is thus unseated, fluid under pressure from the supply pipe 20 will flow to pipe 17 and thence to the brake cylinder device 16 to effect operation of said device to apply the brake to the propeller shaft 11, as above described.

Upon release of fluid under pressure from piston chamber 343, spring 342 will return piston 335 to the position shown in the drawing. The pressure of spring 331 on valve 328 is greater than the opposing pressure of spring 341 on the valve stem 332, so that, as piston 335 is returned to the position shown in the drawing, the spring 331 will move the two valves 328 and 329 in unison and with said piston until valve 328 becomes seated to cut-off the supply of fluid under pressure to the brake cylinder pipe 17. After valve 328 is seated, the spring 341 will hold valve 329 against movement, so that, plunger 334 moving with piston 335 as it returns to the position shown in the drawing, will move out of seating engagement with valve 329 and thereby open pipe 17 to atmosphere by way of chamber 337 and port 21 for releasing fluid under pressure from the brake cylinder device 16 to thereby release the brake on the propeller shaft 11, as above described.

The pipe 19 leads to the side outlet of a double check valve device 22, the opposite end outlets of which device are connected by pipes 23 and 24 to brake interlock valve devices 25 and 26 associated with the clutches 4 and 5, respectively. The double check valve device 22 is of conventional structure and, as shown in Fig. 10 of the drawings, comprises a shuttle valve 344 which upon supply of fluid under pressure to pipe 23 with pipe 24 vented, will operate in the usual manner to open pipe 23 to pipe 19 and close communication between pipe 19 and pipe 24, while upon supply of fluid under pressure to pipe 24 with pipe 23 vented the shuttle valve 344 will operate to open pipe 24 to pipe 19 and close communication between pipes 19 and 23.

The supply and release of fluid under pressure to and from the pipes 23 and 24 is under the control of the brake interlock valve devices 25 and 26, respectively. These devices are identical, in construction and, for illustrative purposes, each may comprise a casing containing a rotary type plug valve 27 arranged to be turned to either of two different positions by a lever 28. At the interlock valve device 25, the end of lever 28 is connected by a rod 29 to the clutch control lever 6 associated with engine 1, while at the brake interlock valve device 26, the lever 28 is connected by a corresponding rod 29 to the clutch control lever 6 associated with engine 2. It will thus be seen that movement of either clutch control lever 6 to its engaged position or its disengaged position will turn the respective plug valve 27 to corresponding positions.

The plug valve 27 in each of the brake interlock valve devices 25 and 26 is provided with a passage 30 arranged to connect the respective pipe 23 or 24 to atmosphere when the respective clutch control lever 6 is in the clutch disengaged position and to connect said pipe to a control pipe 59 when the lever is in the clutch engaged position. The pipe 59 at each engine is arranged to be either supplied with fluid under pressure or to be opened to the atmosphere in a manner which will be later described.

Each of the engines 1 and 2 is provided with a starting air pipe 34 through which air under pressure may be supplied to certain or all of the cylinders of the respective engine through branches 35 (only one of which is shown in the drawings) in order to effect starting of the engine in the direction determined by the timing or condition of the engine's valve gear. The supply of air under pressure to and the cut-off of such supply to pipe 34 at each engine is arranged to be controlled by a starting air valve 36.

The two starting air valve devices 36 are of identical structure and each may comprise, for the purpose of illustration only, a casing containing a rotary plug valve 345 arranged to control communication between the respective pipe 34 and a pipe 346 adapted to be supplied, from any suitable source, with engine starting compressed air. A port 347 in the plug valve 345 is provided for establishing communication between the respective pipes 34a and 34, and a lever 37 is provided for turning said valve to positions for opening and closing said communication. With lever 37 of each of the starting air valves 36 in the position shown in Fig. 1 the supply of starting air to the respective pipe 34 will therefore be cut off, while upon movement of said lever to a position such as indicated by a dot and dash line 38 starting air will be supplied to said pipe, as will be apparent.

Movement of lever 37 of each of the starting air valves 36 to its different positions may be controlled by a starting control cylinder 39 which is in turn controlled by pressure of fluid in a control pipe 31. Each of the cylinders 39 may comprise, as shown in Fig. 8, a piston 40 having at one side a pressure chamber 41 open to the control pipe 31 and having at the opposite side a non-pressure chamber 42 containing a spring 43 acting on the piston for urging it to the position shown when the respective control pipe 31 is devoid of fluid pressure. Upon supply of fluid under pressure through the control pipe 31 and thus to pressure chamber 41, the piston 40 will move against the opposing pressure of spring 43. The piston 40 is provided with a rod 44, a reduced portion 45 of which extends through a suitable bore in the casing and has its end operatively connected to the end of lever 37 of the respective starting air valve 36. At the junction of the larger and smaller portions of the piston rod 44 is a shoulder 46 arranged to engage the end of the casing for limiting movement of the piston 40 by pressure of fluid provided in chamber 41. With this construction it will be seen that with piston 40 in the position in which it is shown in Fig. 8, which condition will be obtained with chamber 41 open to atmosphere, the respective starting air valve 36 will cut off the supply of starting air to pipe 34, while upon movement of piston 40 by pressure of fluid in chamber 41 to the position in which shoulder 46 on the piston rod engages the casing, the respective air valve 36 will be moved to the position for supplying starting air to the starting air pipe 34.

Each of the engines 1 and 2 is provided with a conventional speed governor 50 arranged to be driven by and to operate at a speed proportional to that of the engine for limiting the fuel supply to and thus the speed of the engine in accordance with the adjustment of a governor control lever 51. The lever 51 may have an engine idling position in which it is shown in the drawing and may be adjusted to any position between this idling position and a maximum speed position such as indicated by a dot and dash line 52. The lever 51 of the governor on each engine is connected to a speed control cylinder 53 arranged to be controlled by pressure of fluid in a pipe 54.

Each of the speed control cylinders 53, may for the purpose of illustration, be identical to the starting control cylinder 39 and thus operative with the respective pipe 54 open to atmosphere to move the connected governor control lever 51 to the engine idling position, and operative upon supply of fluid to said pipe to adjust said lever out of the idling position to a position corresponding to the pressure of such fluid. A certain maximum pressure of fluid in the control pipe 54 will cause operation of each speed control cylinder 53 to move the respective governor control lever 51 to the maximum speed position indicated by the dot and dash line 52, as will be apparent. The control of pressure of fluid in pipe 54 at each of the engines will be hereinafter described.

Associated with each of the engines 1 and 2 is a fuel cut-off device 55 which may be arranged to cut off the supply of fuel to the respective engine in any conventional manner, such for example as by rendering the fuel pumps on the engine ineffective to provide fuel to the engine's injectors. Each fuel cut-off device 55 may be controlled by a lever 56 having a fuel cut-off position in which it is shown in Fig. 1 and which is movable from this position to a fuel cut-in position indicated by a dot and dash line 57. For moving lever 56 of each fuel cut-off device 55 to its different positions it may be connected to a fuel cut-off cylinder 58 which in the present embodiment may be like the cylinders 53 and 39 above described and which is arranged to be controlled through a pipe 59a connected to pipe 59. When fluid under pressure is supplied to pipes 59 and 59a on each engine the respective cylinder 58 will act to move lever 56 of the respective fuel cut-off device 55 to its fuel cut-off position in order to allow stopping of the engine, while upon release of fluid under pressure from said pipes the cylinder 58 will cause movement of said lever to its fuel supply position, indicated by the dot and dash line 57, to allow supply of fuel to said engine.

Each of the engines is provided with a rockable shaft 60 for controlling, in any conventional manner as by gears and racks (not shown) the reversing of the valve timing or valve gear of the respective engine to provide for starting and operation of the engine in either one direction or in the reverse direction. A gear 61 is secured to each of the shafts 60 for turning same and this gear in turn is arranged to be operated in a manner and by means which will be later described.

Engines having characteristics and arranged to be controlled by means such as above set forth briefly are well known to those versed in the art, and since the specific structures of such means and of the engines are not essential to a clear understanding of the invention, any further discussion thereof would only involve unnecessary complications in the present application and hence will be dispensed with.

The system for controlling the starting, stopping, reversing, etc. of the engines 1 and 2 comprises what may be called a maneuvering control device 65 associated with each engine, an operator's or engineer's control valve device 66 associated with each of said maneuvering control devices for individually controlling the respective engine, a remote or pilot's control valve device 67 for controlling in multiple or individually the two engines through the respective maneuvering control devices 65, and a station selector valve device 68 associated with each maneuvering control device 65 for selectively rendering the engines controllable by the respective engineer's control device 66 or by the pilot's control device 67.

The control system further embodies a dual fluid pressure supply system which normally provides an individual supply of fluid under pressure to each of the maneuvering control devices 65 and engineer's control devices 66. This dual fluid pressure supply system embodies a source of fluid pressure, such as may be provided in a storage reservoir 69, and two reducing valve devices 70 and 71 of any suitable structure arranged to supply fluid from this reservoir at a desired reduced pressure through check valves 72 and 73, of identical structure, to pipes 74 and 75 leading to the maneuvering control devices 65 and engineer's control devices 66 associated with engines 1 and 2, respectively. The pilot's control valve device 67 is supplied with fluid under pressure through a pipe 76 connected to pipe 74.

Each maneuvering control device 65 comprises (Fig. 2) a bracket 85 upon which is removably mounted a fluid motor 86 for reversing the valve gear or timing of the respective engine, and a timing or interlock valve device 87. Also removably mounted on each bracket 85 is the respective engineer's control valve device 66 and station selector valve device 68.

Each fluid motor 86, which may hereafter be referred to as the reversing motor, comprises a cylinder containing a double acting piston 88 having at one side a pressure chamber 89 and provided with a rod 90 projecting from the opposite side through a pressure chamber 91 and a pressure head 92 to the exterior of the casing. Outside of the pressure head 92 the rod 90 is provided with gear teeth 90a (Fig. 1), constituting a rack, in mesh with gear 61 of the respective engine, whereby movement of the piston 88 in its cylinder will operate the gear 61 to turn the reversing shaft 60. The piston 88 has two operating positions, namely, the position in which it is shown in Fig. 2 for positioning the shaft 60 to provide for operation of the respective engine in one or what may be called an astern direction, and a second position in contact with the pressure head 92 for conditioning shaft 60 to provide for operation of the respective engine in the reverse, or an ahead direction. Movement of the piston 88 to the astern position shown in Fig. 2 is arranged to be effected by supplying fluid under pressure to chamber 91 to act on one face of the piston while opening chamber 89 at the opposite face to atmosphere. Movement of piston 88 to its ahead position in contact with the pressure head 92 is arranged to be effected by supplying fluid under pressure to chamber 89 while opening chamber 91 to the atmosphere.

In each maneuvering control device the supply and release of fluid under pressure to and from chamber 89 is controlled by means of an ahead control valve device 93, while the supply and release of fluid under pressure to and from chamber 91 is controlled by means of an astern control valve device 94 both of which devices constitute parts of the interlock valve device 87.

The ahead control valve device 93 in each maneuvering control device comprises a supply valve 95 contained in a chamber 96 and arranged to control flow of fluid under pressure from said chamber to a chamber 97 which is connected to chamber 89 through a passage 98 and a choke 99, and also by way of a check valve 100 by-passing said choke, the check valve being arranged to allow relatively rapid flow of fluid under pressure in the direction toward chamber 89 but to close upon reverse or out-flow of fluid under pressure from said chamber to render the choke 99 effective to control the rate of such out-flow. The chamber 96 containing the supply valve 95 also contains a spring 101 constantly effective on said valve for urging it to its closed position shown.

In each maneuvering control device 65 chamber 96 is open through a passage 102, a chamber 103, passage 104 and a chamber 105 to a passage 106 in the bracket 85. This passage 106 in the maneuvering control device associated with engine 1 is arranged to be constantly supplied with fluid under pressure from pipe 74, while in the maneuvering control device associated with engine 2 the passage 106 will constantly be supplied with fluid under pressure from pipe 75.

The ahead control valve device 93 in each maneuvering control device 65 further comprises a fluid pressure release valve 107 contained in chamber 97 and engaging the end of a stem projecting from the supply valve 95 whereby the two valves are movable in unison. The release valve 107 has a fluted stem slidably mounted in a bore 120 provided in a plunger 108 which in turn is mounted to slide in a bore provided in a bushing 109 extending through a chamber 110 which is in constant communication with the atmosphere through a passage 111, a chamber 112, and a port 113. The lower end of bushing 109 engages a ring seal 114 encircling and having sliding contact with the periphery of plunger 108, while engaging the upper end of said bushing is a similar seal 115 also having sliding contact with the periphery of plunger 108. These seals are held under compression at opposite ends of the bushing 109 and in contact with plunger 108 by a nut 116 and are respectively effective to prevent leakage of fluid under pressure along said plunger from chamber 97 to chamber 110 and from chamber 110 to a chamber 117 into which the plunger 108 extends. The bushing 109 is provided with an annular cavity encircling the plunger 108 and open through a plurality of ports 118 to chamber 110. The plunger 108 is also provided with a plurality of ports 119 establishing communication between ports 118 and bore 120 within the plunger 108.

The plunger 108 is provided in chamber 117 with a head 121 disposed above an annular stop shoulder 122 provided for engagement with said head to limit downward movement thereof, and interposed between this head and the opposite end of chamber 117 is a spring 123 which is under a chosen degree of pressure. A diaphragm follower 124 is secured to the opposite face of head 121 by means of a stud 125 having screwthreaded engagement in a bore extending through said head and into the plunger 108, and mounted in this bore below the stud is a follower 126 having a stem 127 extending through a bore in the plunger and having its end engaging the end of the stem projecting from the release valve 107. An initially compressed spring 128 is interposed between the end of stud 125 and the follower 126 for holding the release valve 107 against movement upon movement of plunger 108 in a direction away from said release valve with the supply valve 95 closed.

The follower 124 engages one side of a flexible diaphragm 129 which has at its opposite side a timing chamber 130. The chamber 130 is connected through a passage 131, a choke 132 and a passage 133 to the respective station selector valve device 68. By-passing the choke 132 is a communication including two check valves 134 and 135, arranged to permit flow of fluid from chamber 130 around the choke 132 at a relatively rapid rate but to prevent flow in the reverse direction, so that inflow of fluid pressure to said chamber may be limited by the flow capacity of choke 132. The check valve 135 is subject to the seating pressure of a light bias spring 136.

With chamber 130 at atmospheric pressure or charged with fluid at a pressure below a certain degree, spring 123 will maintain the diaphragm 124 in contact with a stop 137 and the plunger 108 will be elevated by said spring to a position such as shown in the drawing to allow closing of the fluid pressure supply valve 95 by spring 101 establishing communication between the respective pipes 34a and 34, and a lever 37 is provided for turning said valve to positions for opening and closing said communication. With lever 37 of each of the starting air valves 36 in the position shown in Fig. 1 the supply of starting air to the respective pipe 34 will therefore be cut off, while upon movement of said lever to a position such as indicated by a dot and dash line 38 starting air will be supplied to said pipe, as will be apparent.

Movement of lever 37 of each of the starting air valves 36 to its different positions may be controlled by a starting control cylinder 39 which is in turn controlled by pressure of fluid in a control pipe 31. Each of the cylinders 39 may comprise, as shown in Fig. 8, a piston 40 having at one side a pressure chamber 41 open to the control pipe 31 and having at the opposite side a non-pressure chamber 42 containing a spring 43 acting on the piston for urging it to the position shown when the respective control pipe 31 is devoid of fluid pressure. Upon supply of fluid under pressure through the control pipe 31 and thus to pressure chamber 41, the piston 40 will move against the opposing pressure of spring 43. The piston 40 is provided with a rod 44, a reduced portion 45 of which extends through a suitable bore in the casing and has its end operatively connected to the end of lever 37 of the respective starting air valve 36. At the junction of the larger and smaller portions of the piston rod 44 is a shoulder 46 arranged to engage the end of the casing for limiting movement of the piston 40 by pressure of fluid provided in chamber 41. With this construction it will be seen that with piston 40 in the position in which it is shown in Fig. 8, which condition will be obtained with chamber 41 open to atmosphere, the respective starting air valve 36 will cut off the supply of starting air to pipe 34, while upon movement of piston 40 by pressure of fluid in chamber 41 to the position in which shoulder 46 on the piston rod engages the casing, the respective air valve 36 will be moved to the position for supplying starting air to the starting air pipe 34.

Each of the engines 1 and 2 is provided with a conventional speed governor 50 arranged to be driven by and to operate at a speed proportional to that of the engine for limiting the fuel supply to and thus the speed of the engine in accordance with the adjustment of a governor control lever 51. The lever 51 may have an engine idling position in which it is shown in the drawing and may be adjusted to any position between this idling position and a maximum speed position such as indicated by a dot and dash line 52. The lever 51 of the governor on each engine is connected to a speed control cylinder 53 arranged to be controlled by pressure of fluid in a pipe 54.

Each of the speed control cylinders 53, may for the purpose of illustration, be identical to the starting control cylinder 39 and thus operative with the respective pipe 54 open to atmosphere to move the connected governor control lever 51 to the engine idling position, and operative upon supply of fluid to said pipe to adjust said lever out of the idling position to a position corresponding to the pressure of such fluid. A certain maximum pressure of fluid in the control pipe 54 will cause operation of each speed control cylinder 53 to move the respective governor control lever 51 to the maximum speed position indicated by the dot and dash line 52, as will be apparent. The control of pressure of fluid in pipe 54 at each of the engines will be hereinafter described.

Associated with each of the engines 1 and 2 is a fuel cut-off device 55 which may be arranged to cut off the supply of fuel to the respective engine in any conventional manner, such for example as by rendering the fuel pumps on the engine ineffective to provide fuel to the engine's injectors. Each fuel cut-off device 55 may be controlled by a lever 56 having a fuel cut-off position in which it is shown in Fig. 1 and which is movable from this position to a fuel cut-in position indicated by a dot and dash line 57. For moving lever 56 of each fuel cut-off device 55 to its different positions it may be connected to a fuel cut-off cylinder 58 which in the present embodiment may be like the cylinders 53 and 39 above described and which is arranged to be controlled through a pipe 59a connected to pipe 59. When fluid under pressure is supplied to pipes 59 and 59a on each engine the respective cylinder 58 will act to move lever 56 of the respective fuel cut-off device 55 to its fuel cut-off position in order to allow stopping of the engine, while upon release of fluid under pressure from said pipes the cylinder 58 will cause movement of said lever to its fuel supply position, indicated by the dot and dash line 57, to allow supply of fuel to said engine.

Each of the engines is provided with a rockable shaft 60 for controlling, in any conventional manner as by gears and racks (not shown) the reversing of the valve timing or valve gear of the respective engine to provide for starting and operation of the engine in either one direction or in the reverse direction. A gear 61 is secured to each of the shafts 60 for turning same and this gear in turn is arranged to be operated in a manner and by means which will be later described.

Engines having characteristics and arranged to be controlled by means such as above set forth briefly are well known to those versed in the art, and since the specific structures of such means and of the engines are not essential to a clear understanding of the invention, any further discussion thereof would only involve unnecessary complications in the present application and hence will be dispensed with.

The system for controlling the starting, stopping, reversing, etc. of the engines 1 and 2 comprises what may be called a maneuvering control device 65 associated with each engine, an operator's or engineer's control valve device 66 associated with each of said maneuvering control devices for individually controlling the respective engine, a remote or pilot's control valve device 67 for controlling in multiple or individually the two engines through the respective maneuvering control devices 65, and a station selector valve device 68 associated with each maneuvering control device 65 for selectively rendering the engines controllable by the respective engineer's control device 66 or by the pilot's control device 67.

The control system further embodies a dual fluid pressure supply system which normally provides an individual supply of fluid under pressure to each of the maneuvering control devices 65 and engineer's control devices 66. This dual fluid pressure supply system embodies a source of fluid pressure, such as may be provided in a storage reservoir 69, and two reducing valve devices 70 and 71 of any suitable structure arranged to supply fluid from this reservoir at a desired reduced pressure through check valves 72 and 73, of identical structure, to pipes 74 and 75 leading to the maneuvering control devices 65 and engineer's control devices 66 associated with engines 1 and 2, respectively. The pilot's control valve device 67 is supplied with fluid under pressure through a pipe 76 connected to pipe 74.

Each maneuvering control device 65 comprises (Fig. 2) a bracket 85 upon which is removably mounted a fluid motor 86 for reversing the valve gear or timing of the respective engine, and a timing or interlock valve device 87. Also removably mounted on each bracket 85 is the respective engineer's control valve device 66 and station selector valve device 68.

Each fluid motor 86, which may hereafter be referred to as the reversing motor, comprises a cylinder containing a double acting piston 88 having at one side a pressure chamber 89 and provided with a rod 90 projecting from the opposite side through a pressure chamber 91 and a pressure head 92 to the exterior of the casing. Outside of the pressure head 92 the rod 90 is provided with gear teeth 90a (Fig. 1), constituting a rack, in mesh with gear 61 of the respective engine, whereby movement of the piston 88 in its cylinder will operate the gear 61 to turn the reversing shaft 60. The piston 88 has two operating positions, namely, the position in which it is shown in Fig. 2 for positioning the shaft 60 to provide for operation of the respective engine in one or what may be called an astern direction, and a second position in contact with the pressure head 92 for conditioning shaft 60 to provide for operation of the respective engine in the reverse, or an ahead direction. Movement of the piston 88 to the astern position shown in Fig. 2 is arranged to be effected by supplying fluid under pressure to chamber 91 to act on one face of the piston while opening chamber 89 at the opposite face to atmosphere. Movement of piston 88 to its ahead position in contact with the pressure head 92 is arranged to be effected by supplying fluid under pressure to chamber 89 while opening chamber 91 to the atmosphere.

In each maneuvering control device the supply and release of fluid under pressure to and from chamber 89 is controlled by means of an ahead control valve device 93, while the supply and release of fluid under pressure to and from chamber 91 is controlled by means of an astern control valve device 94 both of which devices constitute parts of the interlock valve device 87.

The ahead control valve device 93 in each maneuvering control device comprises a supply valve 95 contained in a chamber 96 and arranged to control flow of fluid under pressure from said chamber to a chamber 97 which is connected to chamber 89 through a passage 98 and a choke 99, and also by way of a check valve 100 by-passing said choke, the check valve being arranged to allow relatively rapid flow of fluid under pressure in the direction toward chamber 89 but to close upon reverse or out-flow of fluid under pressure from said chamber to render the choke 99 effective to control the rate of such out-flow. The chamber 96 containing the supply valve 95 also contains a spring 101 constantly effective on said valve for urging it to its closed position shown.

In each maneuvering control device 65 chamber 96 is open through a passage 102, a chamber 103, passage 104 and a chamber 105 to a passage 106 in the bracket 85. This passage 106 in the maneuvering control device associated with engine 1 is arranged to be constantly supplied with fluid under pressure from pipe 74, while in the maneuvering control device associated with engine 2 the passage 106 will constantly be supplied with fluid under pressure from pipe 75.

The ahead control valve device 93 in each maneuvering control device 65 further comprises a fluid pressure release valve 107 contained in chamber 97 and engaging the end of a stem projecting from the supply valve 95 whereby the two valves are movable in unison. The release valve 107 has a fluted stem slidably mounted in a bore 120 provided in a plunger 108 which in turn is mounted to slide in a bore provided in a bushing 109 extending through a chamber 110 which is in constant communication with the atmosphere through a passage 111, a chamber 112, and a port 113. The lower end of bushing 109 engages a ring seal 114 encircling and having sliding contact with the periphery of plunger 108, while engaging the upper end of said bushing is a similar seal 115 also having sliding contact with the periphery of plunger 108. These seals are held under compression at opposite ends of the bushing 109 and in contact with plunger 108 by a nut 116 and are respectively effective to prevent leakage of fluid under pressure along said plunger from chamber 97 to chamber 110 and from chamber 110 to a chamber 117 into which the plunger 108 extends. The bushing 109 is provided with an annular cavity encircling the plunger 108 and open through a plurality of ports 118 to chamber 110. The plunger 108 is also provided with a plurality of ports 119 establishing communication between ports 118 and bore 120 within the plunger 108.

The plunger 108 is provided in chamber 117 with a head 121 disposed above an annular stop shoulder 122 provided for engagement with said head to limit downward movement thereof, and interposed between this head and the opposite end of chamber 117 is a spring 123 which is under a chosen degree of pressure. A diaphragm follower 124 is secured to the opposite face of head 121 by means of a stud 125 having screwthreaded engagement in a bore extending through said head and into the plunger 108, and mounted in this bore below the stud is a follower 126 having a stem 127 extending through a bore in the plunger and having its end engaging the end of the stem projecting from the release valve 107. An initially compressed spring 128 is interposed between the end of stud 125 and the follower 126 for holding the release valve 107 against movement upon movement of plunger 108 in a direction away from said release valve with the supply valve 95 closed.

The follower 124 engages one side of a flexible diaphragm 129 which has at its opposite side a timing chamber 130. The chamber 130 is connected through a passage 131, a choke 132 and a passage 133 to the respective station selector valve device 68. By-passing the choke 132 is a communication including two check valves 134 and 135, arranged to permit flow of fluid from chamber 130 around the choke 132 at a relatively rapid rate but to prevent flow in the reverse direction, so that inflow of fluid pressure to said chamber may be limited by the flow capacity of choke 132. The check valve 135 is subject to the seating pressure of a light bias spring 136.

With chamber 130 at atmospheric pressure or charged with fluid at a pressure below a certain degree, spring 123 will maintain the diaphragm 124 in contact with a stop 137 and the plunger 108 will be elevated by said spring to a position such as shown in the drawing to allow closing of the fluid pressure supply valve 95 by spring 101 and opening of the release valve 107 under the action of spring 128. When fluid is supplied to chamber 130 at a pressure sufficient to overcome the opposing force of spring 123, the diaphragm 129 will deflect downwardly to an extent limited by contact between plunger head 121 and the annular stop 122. The force of spring 101 against the supply valve 95 exceeds that of spring 128 against the release valve 107, as a result of which, this downward movement of diaphragm 129 and follower 124 and thereby of plunger 108 will be relative to the release valve 107 until said plunger contacts said valve which closes communication between chamber 97 and chamber 110. Further movement of the diaphragm follower will then act through the release valve 107 to open the supply valve 95.

The astern control valve device 94 in each maneuvering control device 65 is structurally identical to the ahead control valve device 93 just described and, briefly, comprises a fluid pressure supply valve 140, a fluid pressure release valve 141 and a flexible diaphragm 142 operatively connected to these valves for controlling same in accordance with pressure of fluid in a control chamber 143 which is connected through a passage 144, a choke 145 and a passage 146, to the respective station selector valve device 68. By-passing the choke 145 is a communication in which are disposed two serially arranged check valves, 147 and 148, to provide relatively rapid outflow of fluid pressure from chamber 143 but to render choke 145 effective to limit inflow. The check valve 148 is subject to the pressure of a light seating spring 149.

In the astern control valve device 94 the supply valve 140 is contained in chamber 96 and is arranged to control flow of fluid pressure from said chamber to a chamber 150 containing the release valve 141. Chamber 150 is connected through passage 151 and a choke 152 to chamber 91 below the reversing piston 88. A communication by-passing choke 152 and containing a check valve 153 is provided to allow relatively rapid inflow of fluid pressure to chamber 91 but to limit outflow of fluid pressure therefrom to a degree controlled by the flow capacity of choke 152. The release valve 141 in the astern control valve device 94 is provided for controlling the release of fluid under pressure from chamber 150 and thereby chamber 91 beneath the reversing piston 88 to chamber 110 and thence to the atmosphere.

The timing and interlock valve device 87 associated with each of the maneuvering control valve devices 65 further comprises a starting control valve device 155 for the respective engine, and a fuel and brake control valve device 156 for controlling the cut-in and cut-off of the fuel supply to the respective engine, and for also controlling the brake associated with the propeller shaft 11.

Both of the control valve devices 155 and 156 in each maneuvering control device 65 are structurally identical to the control valve devices 93 and 94 above described.

The starting control valve device therefore comprises a fluid pressure supply valve 157, a fluid pressure release valve 158 and a flexible diaphragm 159 operatively connected to said valves for controlling same. The supply valve 157 is contained in a chamber 160 which is connected by a passage 161 to the respective station selector valve device 68 and said valve is arranged to control flow of fluid from this chamber to a chamber 162 which is connected to pipe 31 leading to the starting air control cylinder 39 on the respective engine. The release valve 158 of the starting control valve device 155 is contained in chamber 162 and arranged to control a fluid pressure release communication between chamber 162 and chamber 110. The diaphragm 159 is arranged to be controlled by the pressure of a spring 167 and the opposing pressure of fluid in a chamber 163 which is connected through a passage 164 and a choke 165 to a passage 166 in the bracket 85.

The fuel and brake control valve device 156 comprises a valve 170, a valve 171 and a flexible diaphragm 172 for controlling said valves in accordance with pressure of fluid effective in a chamber 173 and the opposing pressure of a control spring 169. In the present structure the valve 170 constitutes a release valve which is contained in chamber 112 and which is arranged to release fluid under pressure from a chamber 174 to chamber 112 for flow to the atmosphere through port 113. The valve 171 constitutes a supply valve for controlling supply of fluid under pressure from chamber 103 to chamber 174 which is connected to pipes 59a and 59 leading to the fuel cut-off cylinder 58 and to the brake interlock valve device 25 or 26 associated with the respective engine. Chamber 173 is connected through a communication including two serially arranged check valves 175 and 176 to passage 164, the check valves being arranged to provide for flow of fluid under pressure from said passage to said chamber but to prevent flow in the opposite direction. The check valve 176 is subject to the light seating pressure of a bias spring 177 urging same to its closed position.

The timing and interlock device 87 associated with each maneuvering control device 65 also comprises a double check valve 182 open at opposite ends to passages 178 and 179 connected respectively to chambers 97 and 150 in the ahead and astern control valve devices 93 and 94. The double check valve 182 is arranged to control communication between the two passages 178 and 179 and a passage 180 which leads to chamber 173 above the diaphragm 172 in the fuel and brake control valve device 156. With the double check valve in the position shown it opens communication between passages 180 and 178 and closes communication between passages 180 and 179. In an opposite position the double check valve will open passage 180 to passage 179 and will close communication between passage 180 and passage 178.

In the bracket 85 of each maneuvering control device is a double check valve device 185 comprising a bushing 186 which is encircled midway between its ends by an annular cavity 187 to which is connected passage 166. The bushing 186 is provided interiorly and midway between its ends with a bridge having an axial bore 188 open to chamber 187 through a plurality of radial bores 189. At one end of the axial bore 188 is an annular seat 190 arranged for sealing engagement by a valve 191 contained in a chamber 192, while at the opposite end of said bore is an oppositely arranged annular seat 193 provided for sealing engagement by a valve 194 contained in a chamber 195. The two valves 191 and 194 are connected for movement in unison by a stem 196 loosely extending through the axial bore 188. This stem is of such construction as to allow flow of fluid past either valve 191 or 194, when unseated, to bore 188 for supply to the annular chamber 187.

Chamber 192 is connected to a passage 197 arranged to be connected to chamber 91 below the reversing piston 88 when said piston is in its upper or astern position as shown in the drawing. Chamber 195 is connected to a passage 198 arranged to be opened to chamber 89 above the reversing piston 88 when said piston is in its lower or ahead position in contact with the pressure head 92. A choke 199 is provided in passage 197 to limit flow of fluid pressure through said passage in the direction of chamber 192 in the double check valve device 185 for reasons which will be later described. The flow capacity of choke 199 is however great enough with respect to clearance space which may be provided around the double check valve 191 to allow flow of fluid past said valve to the axial bore 188, to provide a sufficient differential in fluid pressures on said valve upon said flow to move said valve into contact with seat 190 when chamber 195 containing the check valve 194 is at a pressure slightly exceeding atmospheric pressure. A similar choke 200 is provided in passage 198.

The station selector valve device 68 associated with each of the maneuvering control devices 65 comprises a rotary valve 202 contained in a chamber 275 and having two different control positions, namely a remote control position, in which it is shown in Fig. 2, to provide for control of the respective engine by operation of the pilot's control valve device 67, and a local control position, in which it is shown in Fig. 3, to provide for individual control of the engine by the respective engineer's control valve device 66. A hand operated lever 203 is operatively connected to the rotary valve 202 for turning same to its different positions.

The brackets 85 of the two maneuvering control devices 65 are connected in parallel (Fig. 1) to an ahead control pipe 205, an astern control pipe 206, a starting control pipe 207 and a speed control pipe 208, and all of these pipes are also connected to the pilot's control valve device 67. At each engine, pipe 54 connected to the speed control cylinder 53 is also connected to the respective bracket 85, as well as the fluid pressure supply pipe 74 or 75, as above described.

All of these pipes 205, 206, 207 and 208 and 54, as well as passage 106 in the bracket, which is supplied with fluid under pressure from either pipe 74 or 75, are connected to the seat of the rotary valve 202 in each of the station selector valve devices.

In the remote control position of the rotary valve 202 in each selector device 68, the ahead control pipe 205 is connected by a cavity 209 in said valve to passage 133 leading to the ahead control valve device 93, while the astern control pipe 206 is connected through a cavity 210 in said valve to passage 146 leading to the astern control valve device 94. The starting control pipe 207 is connected through a cavity 211 in said valve to passage 161 leading to the starting control valve device 155, while the speed control pipe 208 is connected by a cavity 212 in said valve to pipe 54 leading to the speed control cylinder 53.

Also connected to the seat of rotary valve 202 in each station selector valve device 68 are passages 205a, 206a, 207a, 208a and 76a. All of these passages are closed by the rotary valve 202 in its remote control position (Fig. 2) except passage 76a which is opened through a cavity 216 in said valve to an atmospheric exhaust port 217.

In the local control position of each rotary valve 202 (Fig. 3) the ends of pipes 208, 206 and 205 are lapped by said rotary valve and the fluid pressure supply passage 106 is connected by a cavity 217a to passage 76a. The ahead passage 133 and astern passage 146 are connected, respectively, by cavities 218 and 219 in the rotary valve to passages 205a and 206a. The starting control passage 161 is connected by a cavity 220 in the valve 200 to passage 207a, while the speed control pipe 54 is connected by a cavity 221 in said valve to passage 208a. In each bracket 85 the passages 205a, 206a, 207a, 208a and 76a all lead to a mounting face 222 on the bracket against which the respective engineer's control valve device 66 is adapted to be removably secured.

As above described the several pipes connected to the brackets 85 of the two maneuvering control valve devices 65 are also connected to the pilot's control valve device 67, such connections being made to a bracket 223 upon which the pilot's control valve device is removably mounted. The passages 205a, 206a, 207a, 208a and 76a opening at the face 222 of each of the maneuvering control device brackets 85 correspond in relative position and in function to those in the bracket 223 of the pilot's control valve device 67, whereby the same control valve device can be used at the pilot's control station and at the engineer's control station at each engine.

In Fig. 4 of the drawings is shown the pilot's control valve device 67 mounted on the bracket 223, and since the engineer's control valve devices 66 are identical, except for the part upon which they are mounted, the following description of the pilot's control device 67 will therefore apply to the engineer's control device 66.

As shown in Fig. 4, the pilot's control valve device 67 comprises a base portion arranged for mounting on the bracket 223 and contains an ahead pilot valve device 224 and an astern pilot valve device 225. Mounted on the base portion is a speed control valve device 226 with which there is associated a starting control valve device 227.

The ahead pilot valve device 224 comprises a fluid pressure supply valve 228 which is contained in a chamber 229 supplied with fluid under pressure from pipe 76 and arranged to control communication between said chamber and a chamber 230 which is connected to the ahead control pipe 205. A spring 236 in chamber 229 acts on valve 228 to seat same. A release valve 231 contained in chamber 230 rests on the end of a fluted stem projecting from the supply valve 228 and has a stem slidably mounted in a bore 233 provided in a plunger 232 which is mounted to slide in the casing. The valve 231 is provided for controlling communication between chamber 230 and bore 233 in the plunger, which bore is open to the atmosphere through a passage 234. A spring 235 in bore 233 acts on the release valve stem for maintaining the release valve in contact with the stem of the supply valve 228 upon movement of the plunger 232 in a direction away from the release valve for opening communication past said release valve. Upon movement of the plunger 232 in the direction of the release valve 231, the spring 236 will maintain the supply valve 228 seated against the pressure of spring 235 acting on the release valve, whereby the plunger will initially move into contact with the release valve for closing communication between chamber 230 and the atmosphere, and will then act through said valve to unseat the supply valve 228. Upon movement of plunger 232 in the opposite direction or away from the release valve, the spring 236 will seat valve 228 followed by movement of plunger 232 out of contact with the release valve 231.

The astern pilot valve device 225 is structurally identical to the ahead pilot valve device 224 comprising a supply valve 237 contained in chamber 229 for controlling communication between said chamber and a chamber 238 which is connected to the astern control pipe 206. A release valve 239 is provided in chamber 238 for controlling communication between said chamber and the atmosphere. A plunger 240 is provided to cooperate with the release valve 239 for controlling operation thereof and of the supply valve 237.

The starting control valve device 227 may also be structurally identical to the ahead run valve device 224 and may therefore comprise a supply valve 242 contained in a chamber 243 which is supplied with fluid under pressure from pipe 76, and which valve is arranged to control flow of fluid from said pipe to a chamber 244 which is open to the starting control pipe 207. The starting control valve device further comprises a fluid pressure release valve 245 and a plunger 246 arranged to cooperate with said valve to control release of fluid under pressure from chamber 244 to the atmosphere.

The speed control valve device 226 may be of any conventional, preferably self-lapping type, such for example, like that fully disclosed in the copending application of Harry C. May, Serial No. 523,656, filed February 24, 1944, now Patent No. 2,381,222, and assigned to the assignee of the present application. Briefly, this device comprises a plunger 250 operable upon displacement into the device from a normal position in which it is shown in Fig. 4, to supply fluid to the speed control pipe 208 at a pressure proportional to the degree of such displacement and to release fluid under pressure from said pipe upon movement of the plunger out of the device in accordance with the extent of such movement, and to provide for opening of said pipe to atmosphere when in the normal position shown in Fig. 4.

As viewed in Fig. 4 the plungers 232, 240 and 250 of the ahead and astern pilot valve devices 224 and 225 and of the speed control valve 226 are arranged side by side in spaced relation to move in a vertical direction, while the plunger 246 of the starting control valve device 227 is arranged to move horizontally. For controlling movement of these plungers a shaft 251 is provided which extends over the ends of the plungers of the run control devices 224, 225 and speed control device 226 and parallel to the plunger of the starting control device 227. This shaft is suitably journaled in the casing and carries three cams 252, 253 and 254, the peripheral surfaces of which are arranged for engagement, respectively, with the plungers 232 and 240 of the ahead and astern pilot valve devices 224 and 225, and with one side of one end of an arm 255, the opposite side of which engages plunger 250 of the speed control device 226. The other end of arm 255 is fulcrumed on a pin 256 carried by the casing.

The operating shaft 251 is provided with an axial bore in which is slidably mounted a plunger 258 one end of which projects beyond one end of the shaft 251 for connection with one end of a lever 259. The opposite end of lever 259 is fulcrumed on a pin 260 carried by a lug projecting from the casing. Intermediate its ends this lever engages plunger 246 of the starting control valve device 227.

The operating shaft 251 is provided in one side with a slot, and the plunger 258 is provided with an aligned slot 261 and extending into these slots and pivotally mounted on a pin 262 carried in an ear 263 projecting from the shaft 251 is one end of an operator's control lever 264. A pin 265 extending across slot 261 and secured at opposite ends in opposite walls of said slot also extends through a recess provided in the end of the operator's control lever 264. By this construction it will be seen that movement of the operator's control lever 264 about the fulcrum pin 262 lengthwise of the control shaft 251 will shift the plunger 258 longitudinally of said control shaft. Thus movement of the plunger out of the position in which it is shown in Fig. 4 of the drawing will rock the lever 259 in a counter-clockwise direction to move plunger 246 into contact with the release valve 245 and then actuate said release valve to open the supply valve 242 of the starting control device 227 for supplying fluid under pressure to the starting control pipe 207, while the return of the operator's lever to the position in which it is shown will operate the plunger 258 and lever 259 to permit closure of the supply valve 242 and the opening of the release valve 245 for releasing fluid under pressure from the starting control pipe 207.

The operator's control device further comprises a cover 268 which is secured to the base portion thereof and which has a slot 269 (Fig. 5) providing for movement of the operator's control lever 264 in a direction about the axis of the control shaft 251 for rocking said shaft. In this slot the operator's control lever 264 may have a "Stop" position intermediate the ends of the slot, and at one or an "Ahead" side of said "Stop" position, a "Full speed" position and an intermediate or "Run and idle" position. At the opposite side of the "Stop" position the lever may have an "Astern full speed" position and an intermediate or "Run and idle" position, all of these positions being indicated by legends in Fig. 5. Adjacent the "Ahead run and idle" position the cover is provided with another slot 271 to permit lateral movement of the lever out of slot 269 for operating the plunger 258 to effect movement of the starting control valve device 227 for supplying fluid under pressure to the starting control pipe 207. A slot 272, like slot 271, is open to slot 269 adjacent the "Astern run and idle" position to also permit lateral movement of the operator's control lever 264 to effect operation of the starting control valve device 227 to supply fluid under pressure to the starting control pipe 207. With the operator's control lever out of slots 271 and 272 and in slot 269, the starting control valve device 227 will be operated to open the starting control pipe 207 to the atmosphere.

The cam 252 provided on the control shaft 251 is operative upon movement of the operator's control lever out of "Stop" position in the direction of the legend "Ahead" (Fig. 5) to effect operation of the ahead pilot valve device 224 to open communication between the fluid pressure supply pipe 76 and the ahead control pipe 205 by the time said lever reaches the "Ahead run and idle" position and then to maintain this communication open during further movement to the "Ahead full speed" position. In all other positions of the lever 264 the ahead control device 224 will open pipe 205 to the atmosphere. The astern cam 253 is so arranged as to actuate the astern pilot valve device 225 to open the fluid pressure supply pipe 76 to the astern control pipe 206 by the time the operator's control lever obtains "Astern run and idle" position upon movement from "Stop" position, and to then maintain this communication open during further movement of the lever to the "Astern full speed" position. In all other positions of the operator's control lever the cam 253 permits operation of the astern control valve device 225 to open the astern control pipe 206 to atmosphere.

The cam 254 is provided to control displacement of plunger 250 from its normal position into the speed control valve device 226. With the operator's control lever in "Stop" position the plunger 250 will occupy its normal position, in which position the speed control pipe 208 will be open to atmosphere, and the cam 254 is so designed as to maintain this condition upon movement of said lever to both "Run and idle" positions. Upon movement of the operator's control lever past either "Run and idle" position the cam 254 is operative to displace plunger 250 into the speed control device 226 to effect operation thereof for supplying fluid to pipe 208 at a pressure proportional to the extent of such movement, and to provide a maximum pressure of fluid in said pipe in each of the "Full speed" positions.

In each of the station selector valve devices 68 the rotary valve 202 is arranged to be held seated, against pressure of fluid which may be acting on the seating face thereof through any of the passages or cavities open to said face, by fluid under pressure supplied to chamber 275 through a passage 276 from either the fluid pressure supply passage 106 by way of a check valve 277 or from the ahead or astern control pipes 205 or 206 by way of check valve 278 or 279, respectively. The check valves 277, 278 and 279 are arranged to allow flow of fluid under pressure to chamber 275 but to prevent reverse flow out of said chamber.

*Operation*

In operation, let it be assumed that fluid pressure storage reservoir 69 is supplied with fluid under pressure. Fluid at the proper reduced pressure will therefore be supplied by the pressure reducing valve device 70 to pipes 74 and 76 leading to the maneuvering control device 65 associated with engine 1 and to the pilot's control device 67, respectively, while at the same time fluid at the same reduced pressure will be provided by the pressure reducing valve device 71 to pipe 75 through which it will flow to the maneuvering control device 65 associated with engine 2. Fluid under pressure thus supplied to each of the maneuvering control devices 65 will flow to passage 106 therein and thence past the check valve 277 and through passage 276 to the rotary valve chamber 275 for holding the rotary valve 202 seated, and at the same time, fluid will also flow from passage 106 through chamber 105 and passage 104 to chamber 103 in the brake and fuel control device 156 and from chamber 103 through passage 102 to chamber 96 containing the fluid pressure supply valves 95 and 140 of the ahead and astern control valve devices 93 and 94, respectively.

Let it further be assumed that lever 203 and thereby rotary valve 202 in each of the selector valve devices 68 is in the remote control position rendering the engineer's control devices 66 ineffective for controlling operation of the respective engines and rendering the pilot's control device 67 effective to control operation of said engines.

Let it also be assumed that the operator's control lever 264 in the pilot's control valve device 67 is in "Stop" position, under which condition the ahead and astern control pipes 205, 206, the starting control pipe 207 and the speed control pipe 208 will all be open to the atmosphere through, respectively, the valve devices 224, 225, 227 and 226. With these pipes thus vented, the parts of the ahead and astern control devices 93 and 94 in each of the maneuvering control devices 65 will be in the positions shown in Fig. 2 opening chambers 89 and 91 at the opposite sides of the respective reversing pistons 88 to atmosphere. It will be further assumed that the engines have been stopped from previously operating in the astern direction under which condition the reversing piston 88 at each engine will be in its astern position as shown in Fig. 2.

With chambers 91 below the reversing pistons 88 at both engines open to atmosphere as above described, diaphragm chambers 163 in the respective starting control devices 155 will also be open to atmosphere through chambers 91 by way of the double check valve devices 185, so that the parts of said control devices will occupy the positions in which they are shown in Fig. 2 for opening the respective starting control pipes 31 to atmosphere, so that the starting control cylinders 39 will condition the starting air valves 36 as shown in Fig. 1 for cutting off the supply of starting air to the starting air pipes 34 at the two engines. The parts of the brake and fuel control valve devices 156 in both maneuvering control devices 65 will also occupy the positions in which they are shown in Fig. 2 since diaphragm chamber 173 in each of the fuel and brake control devices 156 is opened to the atmosphere by way of the respective double check valve 182 and thence through passage 179 and the ahead control device 93. With the brake and fuel control device 156 at each engine in this condition, fluid under pressure will be supplied from the respective chamber 103 to pipes 59 and 59a leading to the fuel cut-off cylinder 58 and to the brake interlock valve device 25 or 26. The fuel cut-off cylinder 58 on each engine will thereby be operated to actuate the fuel cut-off device 55 to cut off the supply of fuel to the respective engine, so that the engine will be stopped.

With the clutch levers 6, associated with the two engines, in their engaged positions in which they are shown in the drawing, the brake interlock valve devices 25 and 26 will be opening communication between the respective pipes 59 and pipes 23 and 24, so that fluid under pressure will be effective through one or the other of pipes 23 or 24 and pipe 19 in the brake control relay valve device 18 for operating same to supply fluid under pressure to the brake cylinder device 16. The brake cylinder device will thereby be operated to actuate the levers 15 and 14 to force the brake shoes 13 into braking engagement with the brake drum 12 for holding the propeller shaft 11, the engine drive shaft 3 and the two engines against rotation.

*Starting and running engines to propel ship ahead*

Let it be further assumed that the system is applied for controlling propulsion of a ship and that the pilot now desires to start both engines 1 and 2 for moving the ship forwardly or in ahead direction. To accomplish this the pilot will move lever 264 of control device 67 out of "Stop" position to the "Ahead run and idle" position. He may stop such movement in the "Ahead run and idle" position until after the engine is conditioned for operating in the ahead direction in a manner which will be presently described and then move the lever 264 to "Ahead start" position in slot 271, or if desired, he may move the lever directly from "Stop" position to the "Ahead start" position.

Let it be assumed however that he initially moves the lever from "Stop" position merely to the "Ahead run and idle" position adjacent the start slot 271. This movement of the pilot's control lever 264 will rotate the shaft 251 and thereby cam 252 for actuating the ahead pilot valve device 224 to supply fluid under pressure to the ahead control pipe 205 while maintaining the astern control pipe 206 and starting control pipe 207 open to the atmosphere through the respective control valve devices 225 and 227.

Fluid under pressure thus supplied to the ahead control pipe 205 will flow to each of the maneuvering control devices 65 and therein be transmitted through cavity 209 in the selector rotary valve 202 to passage 133 leading to the respective ahead control valve device 93. When the pressure of fluid thus obtained in chamber 130 and acting on one side of diaphragm 129 in each of the ahead control valve devices 93 is increased to a degree sufficient to overcome the opposing force of spring 123, said diaphragm will deflect to close the respective release valve 107 and open the supply valve 95 for supplying fluid under pressure from chamber 96 to chamber 97.

In each maneuvering control device, fluid under pressure then flows from chamber 97 through passage 98 and past the check valve 100 to chamber 89 above the reversing piston 88. At this time chamber 91 below the reversing piston 88 is open to the atmosphere through choke 152, passage 151 and past the release valve 141 in the respective astern control valve device 94, so that the pressure of fluid provided in chamber 89 is rendered effective to move the reversing piston 88 downwardly from its astern position in which it is shown in Fig. 2 to its ahead position in contact with pressure head 92, which movement reverses the valve timing of the respective engine to provide for starting and running of the engine in its ahead direction.

As the reversing piston 88 at each engine is moving from its astern position to its ahead position as just described, the air in chamber 91 is displaced through choke 152 to atmosphere by way of the astern control device 94, and at the same time a portion of said air is also displaced into passage 198 leading to the double check valve device 185. This displacement however is restricted by choke 152 in the communication to the astern control device 94 and by choke 200 into passage 198, so that movement of the piston 88 in the direction of the pressure head 92 will create a certain back pressure in chamber 91 to oppose or dampen such movement so as to prevent sudden movement or slamming of the piston to its ahead position into contact with the pressure head 92.

At the same time as fluid under pressure is supplied from the ahead control valve device 93 to chamber 97 and thence to chamber 89 above the reversing piston 88 in each maneuvering control device 65, fluid from chamber 97 will also flow through passage 178 to the upper end of the double check valve 182 and move said check valve to the position in which it is shown in the drawing in case it is not already in such position, whereupon fluid will flow past said check valve to passage 180 and thence to chamber 173 above the diaphragm 172 in the respective brake and fuel control valve device 156. When the pressure of fluid thus obtained in diaphragm chamber 173 is increased sufficient to overcome the opposing pressure of spring 169 the diaphragm will move downwardly to close the supply valve 171 and to open the release valve 170, whereupon fluid under pressure will be released from pipes 59 and 59a and the respective fuel cut-out cylinder 58 to permit operation of said cylinder to move lever 56 of the fuel control device 55 to its fuel supply position indicated by the dot and dash line 57. This release of fluid under pressure from pipe 59 at both engines will also permit release of fluid under pressure from pipes 23 and 24 through the respective brake interlock valve devices 25 and 26 and thereby from the brake control relay valve device 18 which will then operate to effect a release of the brake on the propeller shaft 11, in order that the propeller may be turned by the engine upon the running thereof.

As the reversing piston 88 in each of the maneuvering control devices 65 is moved from its astern position to its ahead position, the passage 197 is opened to the chamber 89 after a certain slight movement of the piston out of the astern position, whereupon fluid supplied to chamber 89 for moving the piston 88 will flow to said passage and thence to chamber 192 in the double check valve device 185. The pressure of fluid thus provided in chamber 192 and effective on the check valve 191 will then move said valve into contact with the seat rib 190 against opposing pressure of fluid which may be effective in chamber 195 on the check valve 194, and which opposing pressure will substantially equal that provided in chamber 91 by movement of piston 88. At substantially the time the reversing piston 88 attains its ahead position in contact with the pressure head 92, the passage 198 will be opened to chamber 89 above said piston, whereupon fluid effective in said chamber will flow to passage 198 and thence to chamber 195 in the double check valve device 185. Fluid thus provided in chamber 195 will then flow past the unseated check valve 194 to passage 166 and thence through choke 165 and passage 164 to chamber 163 above diaphragm 159 in the starting control valve device 155. When a sufficient pressure is thus obtained in chamber 163 to overcome the opposing pressure of control spring 167 the diaphragm 159 will deflect to close the respective release valve 158 and open the supply valve 157.

The opening of valve 157 in each maneuvering control device 65 as just described will, however, be without effect at this time since chamber 160, which is connected to the starting control pipe 207, is open to the atmosphere by way of the starting control valve device 227 in the pilot's control valve device 67 with the pilot's control lever 264 in the "Ahead run and idle" position adjacent to but out of the start slot 271. Movement of the pilot's control lever 264 into slot 271 will however operate the starting control device 227 to supply fluid to the starting control pipe 207 and thence to chamber 160 in the starting control valve device 155 in both maneuvering control devices. In each maneuvering control device the fluid thus supplied to chamber 160 will then flow past valve 157 in the starting control device 155 to pipe 31 and thence to the respective starting cylinder 39. When the pressure of fluid in the cylinders 39 is then increased to a sufficient degree, said cylinders at both engines will operate the starting air valves 36 to supply starting air to pipes 34 from which it will flow through the different pipes 35 to the engine cylinders for causing the engines to start turning in the direction determined by the engine valve gearing as adjusted by the respective reversing pistons 88. With the fuel control devices 55 adjusted as above described to supply fuel to the engines, such fuel will be provided or injected as the engines are placed in motion by the starting air from pipes 34 and will thus be effective to cause the engines to immediately fire and run in the selected direction.

After the engines are thus placed in motion and are running on fuel supplied thereto, the pilot will move his control lever 264 out of slot 271 to the "Ahead run and idle" position to operate the starting control device 227 to release fluid under pressure from the starting control pipe 207 and thereby from pipes 31 and the starting air cylinders 39 on both engines, whereupon said cylinders will operate the respective starting valves 36 to cut off the supply of starting air to pipes 34. With the pilot's control lever 264 in the "Ahead run and idle" position conditioning the speed control device 226 to open the speed control cylinder 53 at both engines to atmosphere, the engines will then continue to run on fuel at an idling speed.

The pilot may now accelerate the two engines in unison to any desired speed above idling by suitable adjustment of the control lever 264 between the "Ahead run and idle" position and the "Ahead full speed" position for supplying fluid to the speed control cylinders 53 at a pressure to provide corresponding adjustment of the governor control levers 51 at the two engines, as will be apparent.

In the operation above described it will be noted that in each maneuvering control device 65 the supply of fluid under pressure from chamber 89 above the reversing piston 88 through the double check valve device 185 for operating the starting control device 155 is retarded by choke 165 in passage 166, as well as by choke 200 in passage 198. One purpose of choke 200 has hereinbefore been described, but this choke is also effective with choke 165 to delay obtaining sufficient pressure on diaphragm 159 in the starting control device 155 for opening the supply valve 157 for a certain relatively short period of time, such as two seconds, after passage 198 is opened to chamber 89 above the reversing piston 88, in order to insure movement of said piston into contact with pressure head 92 and thus insure a complete reversal of the valve gear or timing of the respective engine before the starting control device 155 can operate to supply fluid under pressure for causing operation of the starting air cylinders 39 on the two engines for supplying starting air to the engines. It will be apparent that this delayed operation of the starting control device 155 at each engine would not be necessary if the operator in starting the engine would merely move the control lever 264 to "Ahead run and idle" position and allow it to remain there until after the operation of the reversing piston 88 had been completed. However, it is more desirable to allow the operator to move the control lever 264 directly to the "Start" position without hesitation in the "Run and idle" position, and under this condition the chokes 200 and 165 insure complete reversal of the engine's valve gear before starting air is supplied to the engine to place the engine in motion.

*Reversal of engines to reverse movement of ship from ahead to astern*

Now let it be assumed that, with the ship being propelled in the ahead direction under the power of both engines 1 and 2, the pilot desires to reverse the direction of movement of the ship under the power of both engines. To accomplish this he will move lever 264 in the control device 67 from whatever position it may occupy between the "Ahead run and idle" and "Ahead full speed" positions to the "Astern run and idle" position and then, if desired, directly into the astern starting slot 272.

This operation of the pilot's control lever 264 will actuate the ahead pilot valve device 224 to open the ahead control pipe 205 to atmosphere and at substantially the same time will actuate the reverse pilot valve device 225 to open the reverse control pipe 206 to a chamber 229, so that fluid under pressure will be supplied to the latter pipe. This operation of the pilot's control lever 264 will also effect operation of the speed control device 226 to open the speed control cylinders 53 at the two engines to atmosphere for releasing fluid under pressure from said cylinders to allow movement of the governor control arms 51 to their engine idling positions and at the same time will also actuate the starting control device 227 to supply starting air to the starting control pipe 207.

The release of fluid under pressure from the ahead control pipe 205 by movement of the pilot's control lever 264 to the "Astern start" position in slot 272 will result, at both engines, in prompt release of fluid under pressure from chamber 130 in the ahead control valve devices 93 by way of the check valves 134 and 135 by-passing the choke 132, whereupon in both of said devices the supply valves 95 will close and the release valves 107 will open for releasing by way of choke 99 fluid under pressure from chamber 89 above the respective reversing pistons 88. At the same time, fluid under pressure will also be released in each maneuvering control device 65 from diaphragm chamber 173 of the brake and fuel control device 156 by way of passage 180, past the double check valve 182, through passage 178 and chamber 97. Fluid under pressure will also be released from diaphragm chamber 163 in the starting control device 155 by way of passage 164, past the two check valves 175 and 176 and thence by way of chamber 173 and passage 180. In each maneuvering control device 65, the choke 99 restricts the rate of release of fluid under pressure from the reversing piston chamber 89 but there is no restricting means in the release communication from diaphragm chambers 173 and 163 of the brake and fuel control device 156 and starting control device 155, and moreover, choke 165 restricts flow of fluid under pressure to said chambers from the reversing piston chamber 89. As a result, promptly upon movement of the pilot's control lever to the "Astern start" position in slot 272, the fuel and brake control device 156 at each engine will operate to supply fluid under pressure to the respective pipe 59, for cutting off the supply of fuel to the engine and for applying the brake to the propeller shaft 11, and the starting control device 155 at each engine will also operate to close communication between the starting control pipe 207, which is supplied with fluid under pressure from the pilot's control device in the "Ahead start" position and the starting pipe 31, and will open the latter pipe to atmosphere to prevent starting air being supplied to the engine during reversing operation.

Fluid under pressure supplied to the astern control pipe 206 upon movement of the pilot's control lever 264 to the "Astern start" position in slot 272 will flow to each of the maneuvering control devices 65 and thence through passage 146 and choke 145 to chamber 143 in the respective astern control device 94. The choke 145 at each astern control device 94 is effective to delay obtaining sufficient pressure in chamber 143 on diaphragm 142 to deflect said diaphragm against the opposing force of the control spring for a period of time sufficient for the engine to be substantially stopped by operation of the brake on the propeller shaft, following which the pressure in chamber 143 will deflect the diaphragm 142 downwardly to close the respective release valve 141 and open supply valve 140. The opening of the supply valve 140 in the astern control device 94 of each maneuvering control device will supply fluid under pressure to chamber 150 from which it will flow in one direction through passage 151 and past check valve 153 to chamber 91 below the reversing piston 88. Since chamber 89 above the reversing piston is at this time open to atmosphere through the ahead control device 93 the pressure of fluid thus obtained in chamber 91 will move the reversing piston 88 from the ahead position in contact with pressure head 92 back to its astern position shown in Fig. 2, the chokes 199 and 99 being effective during this movement to retard displacement of air from chamber 89 in the same manner and for the same purpose as chokes 200 and 152 act upon movement of the reversing piston to its ahead position, as hereinbefore described.

At the same time as fluid under pressure is supplied from the astern control device 94 through chamber 150 to chamber 91 in each of the maneuvering control devices, fluid pressure will also flow from said chamber 150 through passage 179 to the lower end of the double check valve 182 and move said check valve to its upper position, since passage 178, open to the opposite end of the check valve, is at this time open to atmosphere through the respective ahead control valve device 93. In the upper position of the double check valve 182 fluid under pressure will then flow from passage 179 to passage 180 and thence to diaphragm chamber 173 in the brake and fuel control valve device 156 to cause operation of said device to release fluid under pressure from pipe 59 on the respective engine to permit operation of the fuel control cylinder 58 to return the fuel cut-off device 55 on said engine to its fuel cut-in position. This release of fluid under pressure from pipe 59 at the two engines will also permit release of the brake on the propeller shaft 11.

It will be noted that since, in each maneuvering control device, the astern control valve device 94 is prevented from operating to supply air to chamber 91 for reversing the piston 88 until after the engine has been substantially stopped, as above described, the fuel and brake control device 156, as controlled by said astern control device, will maintain the supply of fuel to the engine cut off until after the engine has been substantially stopped and then operate to permit a resupply of fuel to the engine.

In each maneuvering control device, movement of the reversing piston 88 from its ahead position in contact with pressure head 92 to its astern position shown in Fig. 2, will first open passage 198 to chamber 91 so that fluid under pressure will flow from said chamber to chamber 195 in the double check valve device 185, and this pressure acting on the check valve 194 will move same into contact with its seat 193 and thus move the check valve 191 out of engagement with its seat 190. When the reversing piston 88 then attains its astern position, fluid will be supplied from chamber 91 to passage 197 and this fluid will flow past the check valve 191 in the double check valve device 185 to passage 166 and thence through choke 165 to chamber 163 above diaphragm 159 in the starting control valve device 155. At this time the choke 165 acts in the same capacity as before described to delay obtaining sufficient pressure in chamber 163 to deflect diaphragm 159 against spring 167 for a period of time sufficient to insure complete movement of the reversing piston 88 to its astern position shown in Fig. 2. Upon expiration of this time period, the pressure in chamber 163 will then deflect diaphragm 159 to close the release valve 158 and open the supply valve 157. With the supply valve 157 of the starting control valve device 155 thus open, fluid under pressure supplied to the starting control pipe 207 by way of the pilot's control device 67 in its "astern start" position will flow to the starting pipe 31 to thereby effect operation of the starting air cylinder 39 and starting air valve device 36 to supply starting air to the starting pipe 34 on the respective engine. The two engines will then be placed in motion by the starting air supplied to the respective pipes 34, and since the fuel control devices 55 on the engines were previously conditioned for supplying fuel to the engines, the engines, after being placed in motion by starting air, will fire and run on fuel.

After the two engines have been thus started and are running on fuel, the pilot will move his control lever 264 out of the slot 272 back to "Astern run and idle" position to release fluid under pressure from the starting air cylinders 39 at the two engines for thereby cutting off the supply of starting air to the engines. The pilot may then adjust his control lever 264 in the direction of the "Astern full speed" position as required for accelerating the two engines to provide the desired rate of movement of the ship in the astern direction.

*Reversal of engines to reverse movement of ship from astern to ahead*

If the operator should now desire to reverse the direction of movement of the ship from the astern direction under the power of both engines to the ahead direction under the power of both engines he will move the control lever 264 from the position in slot 269 which it may occupy between the "Astern full speed" position and the "Astern run and idle" position to the opposite side of "Stop" position and then, if desired, immediately into the starting slot 271. The two maneuvering control devices 65 will then operate in unison in response to this operation of the pilot's control lever 264 to cut off the supply of fuel to both engines, to cause operation of the brake on the propeller shaft to stop said engines, and to close off the supply of starting air to the engines. Then after the engines have been brought to a stop, the two maneuvering control devices will supply fluid under pressure to chambers 89 above the reversing pistons 88 to effect reversal of the valve timing or gear in both engines and at substantially the same time, will release the brake on the propeller shaft and cause operation of the fuel control devices 56 at both engines to again supply fuel to the engines, and after the valve gear or timing of both engines has been reversed, the manuevering control devices will supply starting air to both engines for causing starting and running thereof in the new direction, in a manner which will be apparent from the above description of the operation of the apparatus in response to movement of the pilot's control lever to reverse the direction of operation of the engines from ahead to astern.

It is desired to point out that in reversing the direction of operation of the engines from astern to ahead, the choke 132 in both maneuvering control devices acts in the same capacity as choke 145 upon reversing the direction of operation of the engines from ahead to astern, i. e., to prevent operation of the reversing pistons 88 to reverse the valve gear or timing in the respective engines, until after the engines have been substantially stopped.

Stopping of engines

In order to stop the engines from either direction of operation the pilot need only move the control lever 264 back to "Stop" position in which both the ahead and astern control pipes 205 and 206 are opened to the atmosphere. The ahead or astern control valve device 93 or 94, whichever was last effective in the two maneuvering control devices 65 to determine the direction of operation of the engines, will then operate upon the release of fluid under pressure from the respective control pipes 205 or 206, to release actuating fluid pressure from the respective reversing piston chambers 89 or 91 and from chamber 173 in the respective fuel and brake control device 156. The parts of the fuel and brake control device 156 in both maneuvering control devices will then return to the positions in which fluid under pressure will be supplied to pipe 59 on each engine to operate the cylinder 58 to actuate the fuel cut-off device 55 to its fuel cut-off position to allow stopping of the engines. Fluid pressure thus provided in pipes 59 on the engines will also flow to the brake interlock valve devices 25 and 26 and with the clutch control levers 6 in their engaging position, fluid under pressure will flow through said devices to pipes 23 and 24 and from one or the other of pipes 23 or 24 through the double check valve device 22 to effect operation of the brake relay valve device 18 to apply the brake to the propeller shaft 11 for bringing the two engines to a stop.

Starting and running engines to propel ship astern

With the engines stopped, the starting and running thereof to cause movement of the ship in the astern direction may be effected by movement of lever 264 of the pilot's control device 67 from "Stop" position into slot 272 and then back to the "Astern run and idle" position and subsequent adjustment thereof in the direction of the "Astern full speed" position, as will be readily apparent from the above description.

Selective individual control of engines

In certain marine service employing a plurality of engines arranged to operate in multiple to drive a ship's propeller and arranged to be controlled in multiple from a single control device, such as the pilot's control device 67 in the present application, it is at times desirable to be able to disconnect at least one of the engines from the propeller and from the pilot's control station for independent control and operation, as for driving other apparatus such as fire pumps. According to the present invention this may be accomplished, for instance with engine 1, by moving the control lever 6 for clutch 4 to disengaged position indicated by dot and dash line 7, to disconnect said engine from drive shaft 3, and by also operating lever 203 of the respective selector valve device 68 to turn the rotary valve 202 from its remote control position (Fig. 2) to the local control position (Fig. 3) in which the respective maneuvering control device 65 is disconnected from the pilot's control device 67 and connected to the local engineer's control device 66. This operation of the selector valve device 68, associated with engine 1, will not affect in any way the control of engine 2 by the pilot's control device 67 in the manner above described. It should however be noted that disengagement of the clutch 4 for engine 1 will actuate the respective interlock valve device 25 to close communication between pipe 23 and pipe 59 on engine 1 and to open pipe 23 to the atmosphere, whereby the stopping of engine 1 cannot cause operation of the brake to brake the propeller shaft 11 and thus interfere with propulsion of the ship by engine 2. Under this condition the control of the brake is wholly under the control of the maneuvering control device 65 associated with engine 2; the double check valve 22 being operative to close communication between pipes 19 and 23 to provide for this control.

With the selector valve device 68, associated with engine 1, in its local control position as shown in Fig. 3 connecting the maneuvering control device on said engine to the respective engineer's control device 66, it will be readily apparent that by operation of said engineer's control device by the engineer in the same manner as the pilot's control valve device 67 was operated as above described, the maneuvering gear control device 65 of engine 1 will operate to effect starting, stopping and reversing of engine 1 in the same manner as above described, but independently of the operation of engine 2 as controlled by the pilot's control device 6.

In a manner like that just described, movement of the selector valve device 68, associated with engine 2, to its local position will transfer the control of said engine from the pilot's control device 67 to the engineer's control device 66 for that engine, and with the respective clutch control lever 6 in its disengaged position, the engine 2 may be controlled by the engineer independently of the engine 1, which may remain under the control of the pilot's control device 6.

It will also be apparent that in case of failure for instance of the pilot's control device 67, movement of both selector valve devices 68 to their local control position will transfer the control of said engines to the individual engineer's control devices 66, whereby the engineer may individually control the operation of both engines for driving the propeller shaft 11. Return of the selector valve devices 68 at either one or both engines to their remote control positions will transfer control of that engine or engines from the engineer back to the pilot, as will be apparent.

Summary

From the above description it will now be seen that we have provided a control system for a ship's propeller or the like embodying a pair of engines adapted to be connected through individual clutches to drive said propeller, and further embodying maneuvering control means for controlling the stopping, starting, reversing and speed of the engines either individually or in multiple. The engines clutches are operable to either connect or disconnect the engines from the propeller shaft with which there is associated a brake to brake said shaft for stopping said propeller and engines. The control of the brake is by the engine maneuvering control means and such control is interlocked with the two engine clutches, so that the brake may be effective to stop the respective engines when their clutches are engaged but ineffective when disengaged. By this arrangement either engine may be disconnected from the propeller for use to drive a fire pump, and the engine may then be stopped if desired, for example, without causing operation of the brake to stop the other engine and without interfering in any way with operation of said brake in connection with the other engine which may still be employed to turn the propeller.

Having now described our invention, what we claim as new and desire to secure by Letters Patent, is:

1. In combination, a member to be driven, a plurality of motors for driving said member, a brake for said member, control means for said motors operable to control running and stopping thereof and to also control application and release of said brake, individual coupling means for each motor for connecting and disconnecting the motor to and from said member, and brake interlock means conditioned upon operation of either coupling means to connect the respective motor to said member to render said brake controllable by said control means and conditionable upon operation of either coupling means to disconnect the respective motor from said member to render said brake noncontrollable by said control means.

2. In combination, a member to be driven, a plurality of motors for driving said member, individual clutch means for each motor for connecting and disconnecting the respective motor to and from said member, an individual brake control pipe associated with each of said motors, individual control means for said motors operable to control running and stopping thereof and also operable upon operation to effect stopping of either motor to effect a supply of fluid under pressure to the respective brake control pipe and upon operation to effect running of the last named motor to effect a release of fluid under pressure from the respective brake control pipe, a double check valve connecting said brake control pipes to a third pipe and being operable by fluid under pressure supplied to either brake control pipe to provide for flow of fluid under pressure therefrom to said third pipe and to close communication between said third pipe and the other brake control pipe, interlock means controlling communication through each of said brake control pipes, individual clutch control means for each clutch means operable upon rendering the respective clutch means effective to effect operation of the respective interlock means to open communication through the brake control pipe controlled thereby and operable upon rendering the respective clutch means ineffective to close said communication and open to atmosphere the portion of the respective pipe connected to said double check valve, and braking means for said member controlled through said third pipe and rendered effective to stop said member upon supply of fluid under pressure to said third pipe and rendered ineffective upon release of fluid under pressure from said third pipe.

3. A control system comprising a shaft to be driven, braking means for said shaft, a pair of engines, means including a clutch for each engine for operatively connecting the respective engine to said shaft, clutch control means for each clutch operable to render the clutch either effective or ineffective, maneuvering control means for each engine operable to control starting, speed and reversing of the engine and also operative to control operation of said braking means, an operator's individual control device for each of said maneuvering control means, an operator's master control device for controlling both of said maneuvering control means in unison, selector means operable to render either said individual control devices effective and said master control device ineffective, or said individual control device ineffective and said master device effective, to control said maneuvering control means, and means controlled by each of said clutch control means operable with the respective clutch effective to render said braking means controllable by the respective maneuvering control means and operable with the respective clutch ineffective to render said braking means non-controllable by the respective maneuvering control means.

HARRY C. MAY.
ROY R. STEVENS.

REFERENCES CITED

The following references are of record in the file of this patent:

UNITED STATES PATENTS

| Number | Name | Date |
|---|---|---|
| 2,289,654 | Keel et al. | July 14, 1942 |